Figure 1:
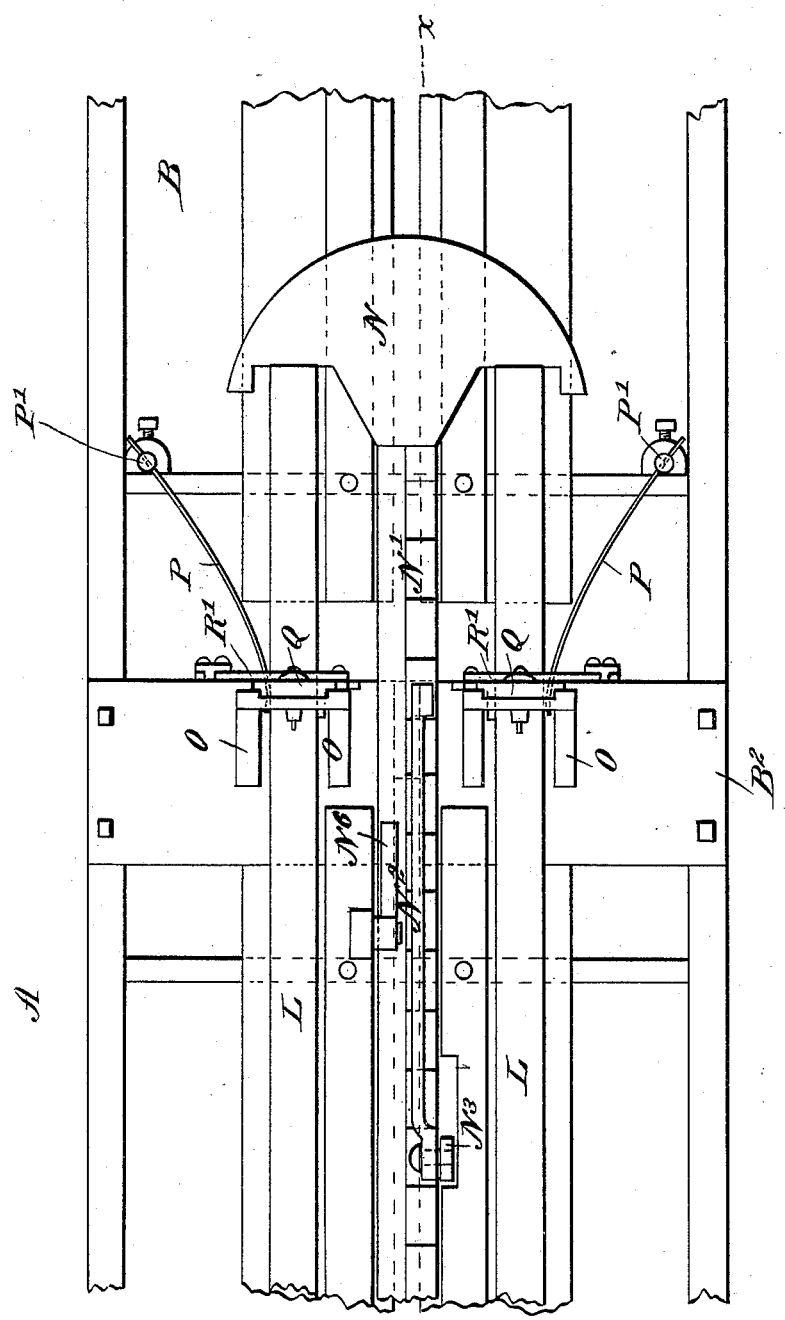

(No Model.) 3 Sheets—Sheet 1.

W. C. & J. A. AYCOCK.
BLIND STILE BORING MACHINE.

No. 423,110. Patented Mar. 11, 1890.

WITNESSES:
Donn Twitchell
C. Sedgwick

INVENTOR:
W. C. Aycock
J. A. Aycock
BY Munn & Co.
ATTORNEYS.

(No Model.)　　W. C. & J. A. AYCOCK.　　3 Sheets—Sheet 2.
BLIND STILE BORING MACHINE.
No. 423,110.　　　　Patented Mar. 11, 1890.
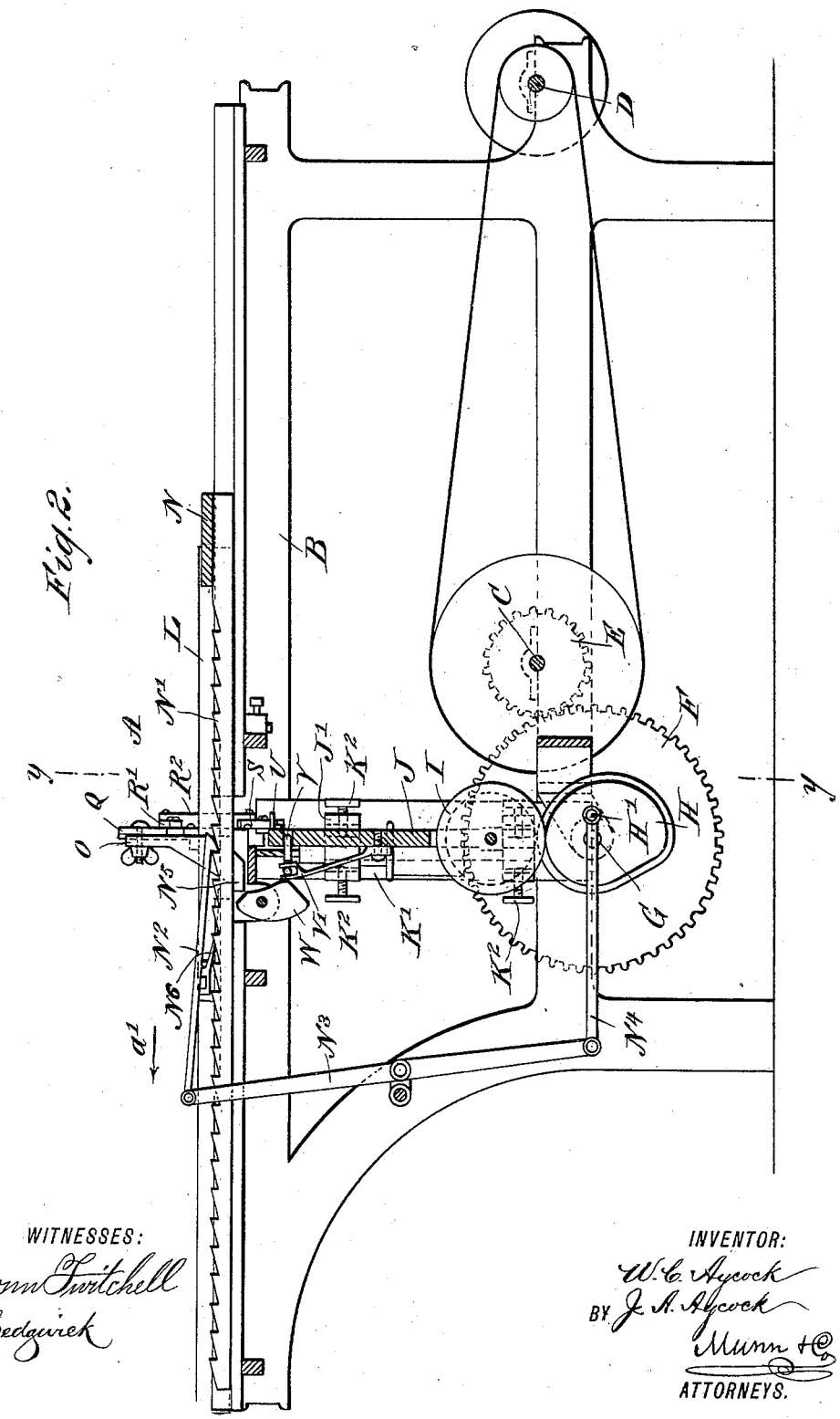
WITNESSES:
INVENTOR:
W. C. Aycock
BY J. A. Aycock
Munn & Co.
ATTORNEYS.

(No Model.) 3 Sheets—Sheet 3.
W. C. & J. A. AYCOCK.
BLIND STILE BORING MACHINE.
No. 423,110. Patented Mar. 11, 1890.
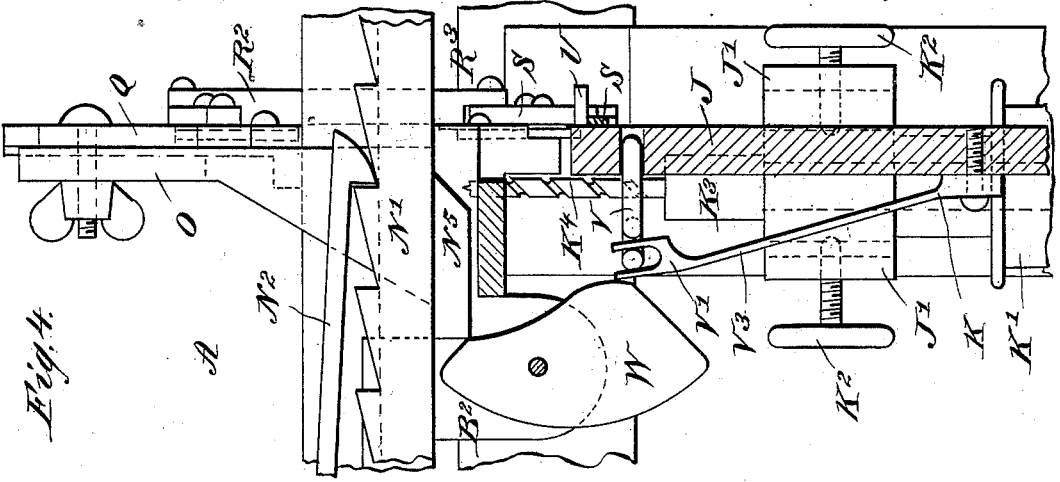
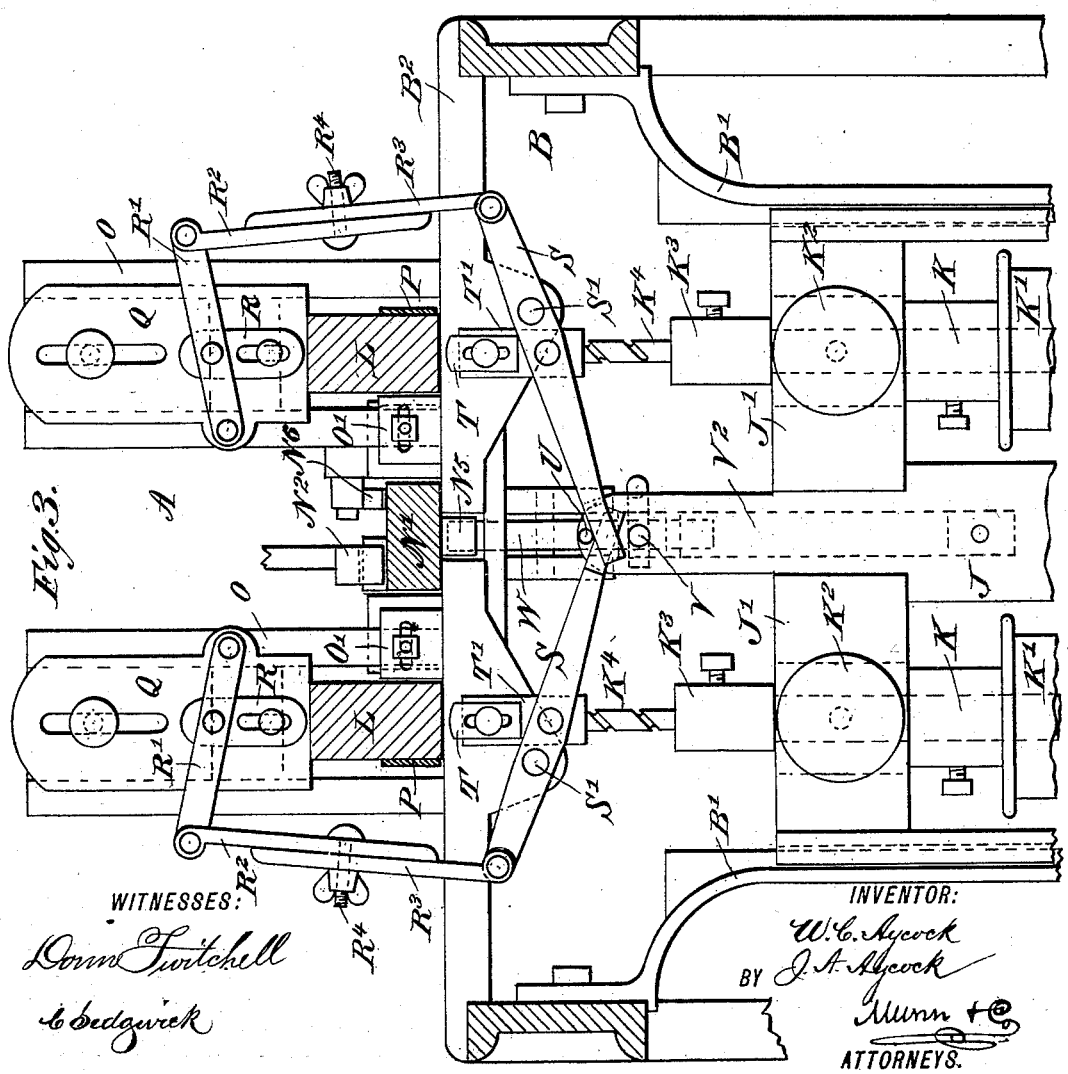

UNITED STATES PATENT OFFICE.

WILLIAM C. AYCOCK AND JOHN A. AYCOCK, OF GRIFFIN, GEORGIA, ASSIGNORS OF ONE-HALF TO JAMES A. BROOKS, OF SAME PLACE.

BLIND-STILE-BORING MACHINE.

SPECIFICATION forming part of Letters Patent No. 423,110, dated March 11, 1890.

Application filed August 13, 1889. Serial No. 320,595. (No model.)

*To all whom it may concern:*

Be it known that we, WILLIAM C. AYCOCK and JOHN A. AYCOCK, both of Griffin, in the county of Spalding and State of Georgia, have invented a new and Improved Blind-Stile-Boring Machine, of which the following is a full, clear, and exact description.

The object of the invention is to provide a new and improved blind-stile-boring machine which is simple and durable in construction, very effective in operation, and rapid in boring the aperture and automatically marking the mortises.

The invention consists of certain parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1 is a plan view of the improvement, portions of the frame being broken away. Fig. 2 is a sectional side elevation of the same on the line $x\ x$ of Fig. 1. Fig. 3 is an enlarged transverse section of the same on the line $y\ y$ of Fig. 2, and Fig. 4 is an enlarged side elevation of part of the improvement.

The improved blind-stile-boring machine A is provided with a suitably-constructed frame B, in which is mounted to turn in suitable bearings the transversely-extending main driving-shaft C, driven by suitable means from the counter-shaft D. On the main driving-shaft C is secured a gear-wheel E, meshing into a larger gear-wheel F, secured on the shaft G, extending transversely and mounted to turn in suitable bearings in the lower part of the main frame B.

On the shaft G is secured an irregularly-shaped cam H, having its periphery preferably V-shaped, and engaged by a correspondingly-shaped wheel I, mounted to turn in suitable bearings in a frame J, mounted to slide vertically on suitable guides B', secured on the sides of the main frame B. (See Fig. 3.) The vertically-sliding frame J is provided with a number of bearings J', according to the number of stiles to be bored at one time. As shown in the drawings, the machine is intended for boring two stiles at a time, and consequently two sets of bearings J' are formed on the vertically-sliding frame J.

In each set of bearings J' is mounted to turn a vertically-extending arbor K, carrying the usual pulley K', over which passes a belt, operated from a suitable pulley on the counter-shaft D, for turning the said arbor. The latter is held vertically adjustable in the bearings J' by set-screws $K^2$. On the upper end of each arbor K is held a socket $K^3$, in which is fastened the usual bit $K^4$, for boring the under side of the stile L, held to slide longitudinally on the top of the main frame B. The end of each stile L rests against the base N, mounted to slide on the top of the main frame B, and provided in the middle with a longitudinally-extending toothed bar N' adapted to be engaged by a pawl $N^2$, pivotally connected with a lever $N^3$, extending downward and fulcrumed on the main frame B. The lower end of the lever $N^3$ is pivotally connected by a link $N^4$ with a crank-pin H', held on one of the faces of the cam H. (See Fig. 2.) A spring $N^6$ is secured on the top of frame B, and presses with its free end on the top of the toothed bar N', to hold the latter down on the bed of the frame.

During one half-revolution of the cam H the pawl $N^2$ draws the notched bar N', the base N, and the stiles L forward in the direction of the arrow $a'$ a distance equal to the space between two apertures to be bored. During the other half of the revolution the pawl $N^2$ is returned to again move the stile forward during the next half-revolution of the cam H.

On a cross-beam $B^2$ of the main frame B are erected suitable standards O, in each of which is held a vertically-adjustable block Q, adapted to rest on top of the stile L, so as to hold the latter in place while the bit $K^4$ bores the hole. On each of the standards O on the inside is held a transversely-adjustable plate O', abutting against one side of the stile L, so as to hold the same in place—that is, in line with the bit $K^4$. On the outside of each stile L presses the free end of a spring-plate P, secured at P' to the sides of the frame B. (See Fig. 1.)

On each of the blocks Q is held to slide vertically a marker R, pivotally connected with the lever R′, fulcrumed on the block Q, and pivotally connected with a slotted arm R², connected with a slotted arm R³ by means of a bolt R⁴ passing through the slots in the said arms. The lower end of the arm R³ is pivotally connected with the outer end of a lever S, fulcrumed at S′ on the transverse beam B², and pivotally connected with a block T′, carrying on its upper end an adjustable marker T, adapted to engage the under side of the stile L. The connection between the levers S and R′ is made adjustable, so as to regulate the movement of the marker R, which is adapted to engage the top of the stile L. The marker T is held adjustable on its block T′, so as to regulate the distance the marker T is to pass into the bottom of the stile L in order to mark the latter.

The inner ends of the levers S are engaged at their top edges by a pin U, projecting from the upper end of the frame J. The lower edges of the levers S are adapted to be engaged by a pin V, held to slide longitudinally in the vertically-sliding frame J, and engaged in its outer end by a fork V′, formed on the free end of a spring V³, secured to the frame J. (See Fig. 4.) The spring V² serves to hold the pin V out of contact with the lower edges of the levers S until the said pin is operated on by a gravity-lever W, fulcrumed on the transverse beam B², and actuated by an offset N⁵, secured on the under side of the toothed bar N′. Any desired number of offsets N⁵ are placed at suitable intervals on the toothed bar N′, according to the mortises to be formed at suitable intervals in the stile L.

The operation is as follows: When the main driving-shaft is set in motion, it imparts a rotary motion to the shaft G, so that the cam H, held on the said shaft, moves the sliding frame J up and down at every revolution. When the frame J slides upward, the turning bits K⁴ bore into the under sides of the stiles L a distance regulated by the vertical adjustment of the arbor K. When the frame J slides downward after the apertures have been bored, the bits K⁴ are disengaged from the stile L, and at this time the motion of the cam H causes a forward motion of the stile L in the direction of the arrow a′, as previously described. During the next half-revolution the pawl N² returns to its former position, the frame J moves upward, and the next holes are bored by the bits K⁴. The above-described operation is then repeated. When the stiles L have been fed forward until they should be marked for the mortises, one of the lugs N⁵ on the under side of the toothed bar N′ passes over the upper edge of the gravity-lever W, so that the latter swings and presses against the pin V, whereby said pin passes under the lower edges of the levers S. When the frame J now moves upward, the said pin V presses against the under edges of the levers S, so that the latter swing downward at their outer ends, thereby drawing the markers R R downward into contact with the tops of the stiles L. As the inner ends of the levers S swing upward the marker-blocks T′ are moved upward and the markers T pressed into the bottoms of the stiles L directly opposite the markers R. Each lug N⁵ is of such a length that the frame J moves up and down twice during the time the said lug passes over the gravity-lever W, so that the two marks are made on both the top and bottom of the stile L, said two marks indicating the length of the mortise to be made. The moment the lug N⁵ has passed the gravity-lever W the latter swings to its former position, and the pin V is withdrawn by the action of the spring V². When the frame J now moves upward, the levers S remain stationary, and the markers R and T do not engage the tops and bottoms of the stiles L until the next lug N⁵ passes over the gravity-lever W, as previously described. Thus it will be seen that by a very simple mechanism the stiles are bored at regular intervals, and are also marked for the usual mortises.

Having thus described our invention, we claim as new and desire to secure by Letters Patent—

1. The combination, with the main frame, the vertically-reciprocating tool-frame thereunder, and the stile-carrier on top of the main frame, of the vertical standards O, between which the stile passes, the gage-plate O′, bolted adjustably to the lower end of one standard, and the plate-spring P, adjustably secured at P′ to the main frame to bear at its inner end against the face of the stile opposite the said gage, substantially as set forth.

2. The combination, with the main frame, the vertically-reciprocating tool-frame, and the stile-carrier mounted on said main frame, of the vertical standards O on top of the main frame, between which the stile passes, the vertically-adjustable block or plate Q on said standards, the vertically-reciprocating marker R on said block or plate, the lever R′, pivoted to the block or plate and to the said marker, and mechanism for operating the lever, substantially as set forth.

3. The combination, with the main frame, the vertically-reciprocating tool-carrying frame, and the longitudinally-sliding stile-carrier mounted on said main frame, of transverse levers pivoted at opposite sides of said carrier above and below the top of the main frame and provided with markers to engage the upper and lower faces of the stiles, connections between the upper and lower levers, and mechanism engaging the inner ends of the lower levers for actuating the markers, substantially as set forth.

4. In a blind-stile-boring machine, the combination, with a frame mounted to slide vertically and carrying the bits, of a cam for raising and lowering the said frame, a stile-carrier operated from the said cam and moving the stile when the frame slides downward and the bits are disengaged from the stile, mortise-markers above and below the carrier, operated from the said carrier and the said sliding frame, and intermediate mechanism connecting the said mortise-markers with the said sliding frame and stile-carrier, substantially as shown and described.

5. In a blind-stile-boring machine, the combination, with a frame mounted to slide vertically and carrying the bits, of mortise-markers above and below the path of the stile to engage the stile on top and bottom, and means, substantially as described, for actuating the said markers on the movement of the said frame, as set forth.

6. In a blind-stile-boring machine, the combination, with a frame mounted to slide and carrying the bits, of markers above and below the path of the stile, adapted to engage the stile, levers connected with the said upper and lower markers, and pins held on the said frame and adapted to actuate the said levers on the up-and-down motion of the said frame, substantially as shown and described.

7. In a blind-stile-boring machine, the combination, with a frame mounted to slide and carrying the bits, of markers adapted to engage the stile, levers connected with the said markers, pins held on the said frame and adapted to actuate the said levers on the up-and-down motion of the said frame, a spring for holding one of the said pins out of contact with the said levers, and mechanism for throwing said pin into engagement with said levers, substantially as shown and described.

8. In a blind-stile-boring machine, the combination, with a frame mounted to slide and carrying the bits, of markers adapted to engage the stile, levers connected with the said markers, pins held on the said frame and adapted to actuate the said levers on the up-and-down motion of the said frame, a gravity-lever adapted to engage one of the said pins to move it in contact with the said levers, and a stile-carrier provided with lugs adapted to press the said lever in contact with the said spring, substantially as shown and described.

9. In a blind-stile-boring machine, the combination, with a frame mounted to slide and carrying the bits, of markers adapted to engage the stile, levers connected with the said markers, pins held on the said frame and adapted to actuate the said levers on the up-and-down motion of the said frame, a gravity-lever adapted to engage one of the said pins to move it in contact with the said levers, a stile-carrier provided with lugs adapted to press the said lever in contact with the said spring, and a cam for operating the said sliding frame and the said stile-carrier, substantially as shown and described.

WILLIAM C. AYCOCK.
JOHN A. AYCOCK.

Witnesses:
W. R. BLOODWORTH,
L. J. AYCOCK.